United States Patent
Zhang et al.

(10) Patent No.: US 9,994,174 B2
(45) Date of Patent: Jun. 12, 2018

(54) SMART POWER SUPPLY INTERFACE, VEHICLE-MOUNTED ELECTRONIC COMPONENT WITH THE SAME AND METHOD OF CONTROLLING THE SAME

(71) Applicant: Auto-Linked Shanghai Info Technology Co., Ltd., Shanghai (CN)

(72) Inventors: Cheng Zhang, Shanghai (CN); Chen Lin, Shanghai (CN); Shouyi Li, Shanghai (CN); Jingting Zhang, Shanghai (CN); Pan Hu, Shanghai (CN)

(73) Assignee: Auto-Linked Shanghai Info Technology Co., Ltd., Shanghai (CN)

( * ) Notice: Subject to any disclaimer, the term of this patent is extended or adjusted under 35 U.S.C. 154(b) by 0 days. days.

(21) Appl. No.: 15/594,979

(22) Filed: May 15, 2017

(65) Prior Publication Data
US 2018/0086293 A1    Mar. 29, 2018

(30) Foreign Application Priority Data

Sep. 27, 2016 (CN) .......................... 2016 1 0857195
Nov. 28, 2016 (CN) .......................... 2016 1 1061172

(51) Int. Cl.
B60R 16/033 (2006.01)
B60R 16/023 (2006.01)

(52) U.S. Cl.
CPC ........ B60R 16/033 (2013.01); B60R 16/0238 (2013.01)

(58) Field of Classification Search
CPC .................................................. G07C 5/0891
See application file for complete search history.

(56) References Cited

U.S. PATENT DOCUMENTS

| 7,130,656 | B2* | 10/2006 | Okagaki | B60R 25/102 455/410 |
|---|---|---|---|---|
| 2010/0171829 | A1* | 7/2010 | Yago | G07C 5/0858 348/143 |
| 2010/0250060 | A1* | 9/2010 | Maeda | G07C 5/0858 701/33.4 |
| 2010/0256858 | A1* | 10/2010 | Yago | G07C 5/0891 701/29.1 |
| 2013/0027558 | A1* | 1/2013 | Ramanath | G06T 3/0018 348/148 |
| 2013/0072350 | A1* | 3/2013 | Ueno | B60W 10/11 477/111 |
| 2013/0162028 | A1* | 6/2013 | Bierley | B60R 16/0215 307/10.1 |
| 2016/0082906 | A1* | 3/2016 | Maeda | B60R 1/12 439/34 |

* cited by examiner

*Primary Examiner* — Thomas G Black
*Assistant Examiner* — Ce Li Li
(74) *Attorney, Agent, or Firm* — Morgan Lewis & Bockius LLP

(57) ABSTRACT

A vehicle-mounted electronic component with a smart power supply interface includes a smart power supply interface module and a component function module. At the vehicle-side, the smart power supply interface module is connected with the vehicle fuse fox and with the CAN bus of the vehicle, and also is connected with the vehicle transmission gear and the vehicle-mounted sensing module respectively. At the component-side, the smart power supply interface module has an ACC output interface and an ACC enhanced output interface for the gating connection of the ACC interface of the component function module.

10 Claims, 3 Drawing Sheets

SMART POWER SUPPLY INTERFACE, VEHICLE-MOUNTED ELECTRONIC COMPONENT WITH THE SAME AND METHOD OF CONTROLLING THE SAME

This application claims priority to CN Application No. 2016108571950, filed on Sep. 27, 2016, and CN Application No. 2016110611725, filed on Nov. 28, 2016; the entire content of which is incorporated herein by reference.

TECHNICAL FIELD

The embodiments of the present invention relates to a vehicle-mounted electronic component, and in particular to a vehicle-mounted electronic component with a smart power supply interface, and to a method of controlling the vehicle-mounted electronic component with the smart power supply interface. Additionally, embodiments of the present invention further relate to a vehicle-mounted smart power supply interface device.

BACKGROUND

With the development of automobile electronic technologies, an increasing number of electronic devices, such as navigators, smart rearview mirrors, driving recorder and the like, are mounted on vehicles. However, not all models of vehicles are equipped with these devices, especially for some of older models of vehicles which are equipped with only a fraction of vehicle-mounted electronic components. Therefore, there are a huge number of aftermarket installed products for vehicle-mounted electronic components to address these deficiencies in such vehicle models.

Most aftermarket installed vehicle-mounted electronic components are powered by vehicle cigarette lighters and are not equipped with a power source by itself, which causes the following three problems. First, these vehicle-mounted electronic components will operate only after a vehicle is started or after Accessory (ACC) position is connected, so that the vehicle-mounted electronic component cannot continue to provide functions for protecting the vehicle after the vehicle is stopped. Second, a G-sensor (a sensor for detecting collision) internal to the vehicle-mounted electronic apparatus currently has different trigger conditions when the vehicle is traveling or stopped, and trigger conditions are often controlled by ACC voltages. However, since the true status of the vehicle cannot be confirmed, a false trigger may often occur easily (for example, the trigger threshold is switched to low when the vehicle is not started, the closing of the vehicle door at this time may often lead to a false trigger). Third, static current and power consumption differ from one electronic component of the vehicle to another, which may over-discharge the battery of the vehicle. Thus, there is a need for a vehicle-mounted electronic component that can overcome the above-mentioned technical problems.

SUMMARY

To overcome the above-mentioned shortcomings, at least some embodiments of the present invention provide a vehicle-mounted electronic component with a smart power supply interface that can be started steadily and can also be started as needed when the vehicle is not started (or ACC position is not connected); meanwhile it may provide an accurate status of vehicle ignition, a status of the door lock and the like, facilitating the accurate determination by a third party apparatus, and may monitor the capacity of the vehicle battery all the time. When the battery capacity reaches some threshold, the vehicle-mounted electronic component is controlled to be put into a deep sleep mode, to avoid the possibility that the vehicle cannot be started due to the depletion of the capacity of the vehicle battery.

According to an aspect of the present invention, there is provided a vehicle-mounted electronic component with a smart power supply interface, the vehicle-mounted electronic component includes a smart power supply interface module and a component function module, wherein the smart power supply interface module has a vehicle-side interface to be connected with one or more vehicle lines and a component-side interface to be connected with a component function module; the component function module is used for implementing basic functions of the vehicle-mounted electronic component. At a vehicle-side, the smart power supply interface module is connected with a vehicle fuse box through an ACC input line, a Battery (BAT) line and a Ground (GND) line, the smart power supply interface module is also connected with a CAN bus of the vehicle. Additionally, the smart power supply interface module is also connected with a vehicle transmission gear and a vehicle-mounted sensing module respectively through a gear trigger signal line and a sensing module signal line. At a component-side, the smart power supply interface module is connected with the component function module through a component-side BAT line, a GND line, a gear trigger signal line, a sensing module signal line and a communication interface. Additionally, the smart power supply interface module has also an ACC output interface and an ACC enhanced output interface for the gating connection of the ACC interface of the component function module.

According to an aspect of the present invention, a vehicle has one CAN bus, and the smart power supply interface module will be connected with the CAN bus of the vehicle.

According to an aspect of the present invention, a vehicle has two CAN buses, and the smart power supply interface module will be connected with both of the CAN buses of the vehicle.

According to an aspect of the present invention, the component function module includes a navigating module, a rearview module and/or a driving recording module.

According to an aspect of the present invention, the component function module is a rearview module, the vehicle transmission gear is a reverse gear, and the vehicle-mounted sensing module is a vehicle rearview camera.

According to an aspect of the present invention, the component function module is a driving recording module, the vehicle transmission gear is a driving gear or reverse gear, and the vehicle-mounted sensing module is a driving recording camera.

According to an aspect of the present invention, the vehicle-mounted sensing module is a G-sensor.

According to an aspect of the present invention, there is provided a method of controlling the above-mentioned vehicle-mount electronic component, the method comprising:

(1) determining whether the smart power supply interface module is properly operating;

(2) if the smart power supply interface module is properly operating, its ACC enhanced interface gets to be connected with the ACC interface of the component function module;

(3) determining whether the smart power supply interface module is in a sleep mode;

(4) if the smart power supply interface module is not in a sleep mode, the ACC enhanced output interface is caused to transfer the electrical level of the BAT, thus causing the component function module to operate properly; and if the smart power supply interface module is in a sleep mode, the level of the ACC enhanced output interface is set to be zero (0), thus putting the component function module into a sleep mode.

According to an aspect of the present invention, when determining whether the smart power supply interface module operates properly, if the smart power supply interface module does not operate properly, its ACC output interface gets to be connected with the ACC interface of the component function module, and the status of the component function module is determined by the status of the vehicle ACC input line.

According to another aspect of the present invention, there is provided a smart power supply interface device, which has a vehicle-side interface to be connected with one or more vehicle lines and has a component-side interface to be connected with the vehicle-mount electronic component. At the vehicle-side, the smart power supply interface device is connected with a vehicle fuse box through an ACC input line, a BAT line and a GND line, the smart power supply interface device is also connected with a CAN bus of the vehicle. Additionally, the smart power supply interface device is also connected with a vehicle transmission gear and a vehicle-mounted sensing module respectively through a transmission gear trigger signal line and a sensing module signal line. At the component-side, the smart power supply interface device is connected with the vehicle-mounted electronic component through a BAT line, a GND line, a transmission gear trigger signal line, a sensing module signal line and a communication interface at the component-side; additionally, the smart power supply device has also an ACC output interface and an ACC enhanced output interface for the gating connection of the ACC interface of the vehicle-mounted electronic component.

DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention. These drawings are not to be construed as limiting the invention, but are illustrative.

DETAILED DESCRIPTION OF EMBODIMENTS

The present invention will be further explained below in embodiments in conjunction with the accompanying drawings and preferred embodiments. It is to be noted that these explanations are illustrative and not intended to be limiting.

Figure 1:
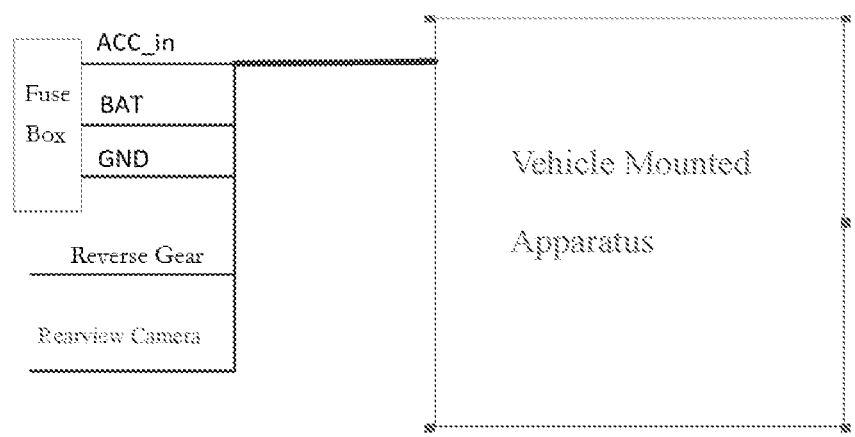
FIG. 1 shows an aftermarket installed vehicle-mounted apparatus.

FIG. 1 shows an aftermarket installed vehicle-mounted apparatus (which may also be referred to herein as "vehicle-mounted equipment", "component functional module" and "vehicle-mounted electronic component"). In the example as shown, the vehicle-mounted apparatus is a vehicle rearview camera, which is connected with a vehicle fuse box through an ACC input line, a BAT line and a GND line; while it is also connected to a reverse gear signal line and a vehicle rearview camera signal line of the vehicle. In operation, the vehicle rearview camera of the vehicle is triggered through the reverse gear of the vehicle. As discussed previously, when the vehicle runs for a long time, its power supply voltage will be reduced, thereby leading to malfunction of the vehicle rearview camera; and the vehicle rearview camera will only operate after the vehicle is started (or at least the ACC position is connected).

Figure 2:
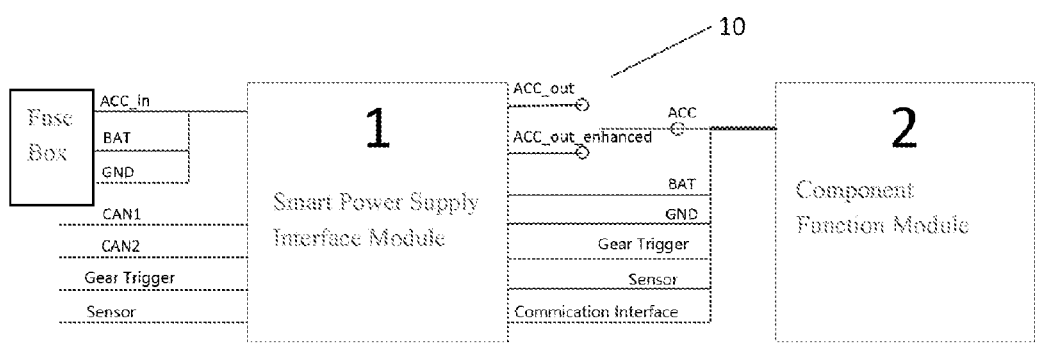
FIG. 2 shows a vehicle-mounted electronic component with a smart power supply interface according to one embodiment of the present invention.

FIG. 2 shows a vehicle-mounted electronic component with a smart power supply interface according to one embodiment of the present invention. The vehicle-mounted electronic component 10 includes a smart power supply interface module 1 and a component function module 2, the smart power supply interface module 1 has a vehicle-side interface to be connected with the vehicle lines (e.g., ACC_in, Bat, GND) and a component-side interface to be connected with the component function module 2; the component function module is used for implementing basic function of the vehicle-mounted electronic component, such as navigating function, vehicle backing rearview function, driving recording function and the like.

At the vehicle-side, the smart power supply interface module 1 is connected with the vehicle fuse box through an ACC input line, a BAT line and a GND line. Additionally, the smart power supply interface module 1 is also connected with the vehicle transmission gear and the vehicle-mounted sensing module respectively through the gear trigger signal line and the sensor signal line.

The smart power supply interface module 1 is further connected with the CAN bus of the vehicle. In an embodiment where the vehicle has only one CAN bus, the smart power supply interface module 1 is connected with the CAN bus of the vehicle; in another embodiment where the vehicle has two CAN buses, the smart power supply interface module 1 is connected with both of the CAN buses of the vehicle (e.g., CAN1 and CAN2 as shown in FIG. 2).

At the component-side, the smart power supply interface module 1 is connected with the component function module 2 through a component-side BAT line, a GND line, a gear trigger signal line, a sensor signal line and a communication interface signal line; additionally, the smart power supply module 1 has also an ACC output interface and an ACC enhanced output interface for the gating connection of the ACC interface of the component function module 2.

In one embodiment, the component function module 2 includes a rearview function, the vehicle transmission gear is a reverse gear, and the vehicle-mounted sensing module is a vehicle rearview camera. After the vehicle is started (or at least the ACC position is connected), the vehicle is engaged in the reverse gear, the component function module is triggered to operate, so that the vehicle rearview camera (not shown) transfers the image to the component function module 2. However, even though the ACC position is not started or connected, after the receiving of an activation instruction from the smart power supply interface module 1, the component function module 2 may operate, turning on the vehicle rearview camera and capturing the image taken by the vehicle rearview camera.

In another embodiment, the component function module 2 includes a driving recording function, the vehicle transmission gear is, for example, a driving gear, and the vehicle-mounted sensing modules is a driving recording camera. It should be understood that in other embodiments, the trigger gear may also be set to transmission gears other than the park gear, such as reverse gear; of course it may also be triggered immediately upon igniting. After the vehicle is started (or at least the ACC position is connected), the vehicle is engaged in a valid gear, triggering the component function module 2 to operate, while the driving recording camera transfers the image to the component function module 2. However, even though the vehicle is not started or the ACC position is not connected, after receiving of an activation instruction from the smart power supply interface module 1, the component function module 2 may operate, turning on the driving recording camera and capturing the image taken by the driving recording camera.

In yet another embodiment, the vehicle-mounted sensing module is an accelerometer (also referred to herein as G-sensor). After the vehicle is stopped, if the vehicle vibrates, G-sensor detects the vibration signal, which is signaled to the smart power supply interface module 1. The smart power supply interface module 1 would determine whether the signal detected by the G-sensor exceeds a set threshold value, and if it exceeds the set threshold value, the component function module 2 may further be activated, the vehicle rearview camera and/or the driving recording camera and other cameras or sensing devices are started, thus recording the circumstance around the vehicle.

Figure 3:
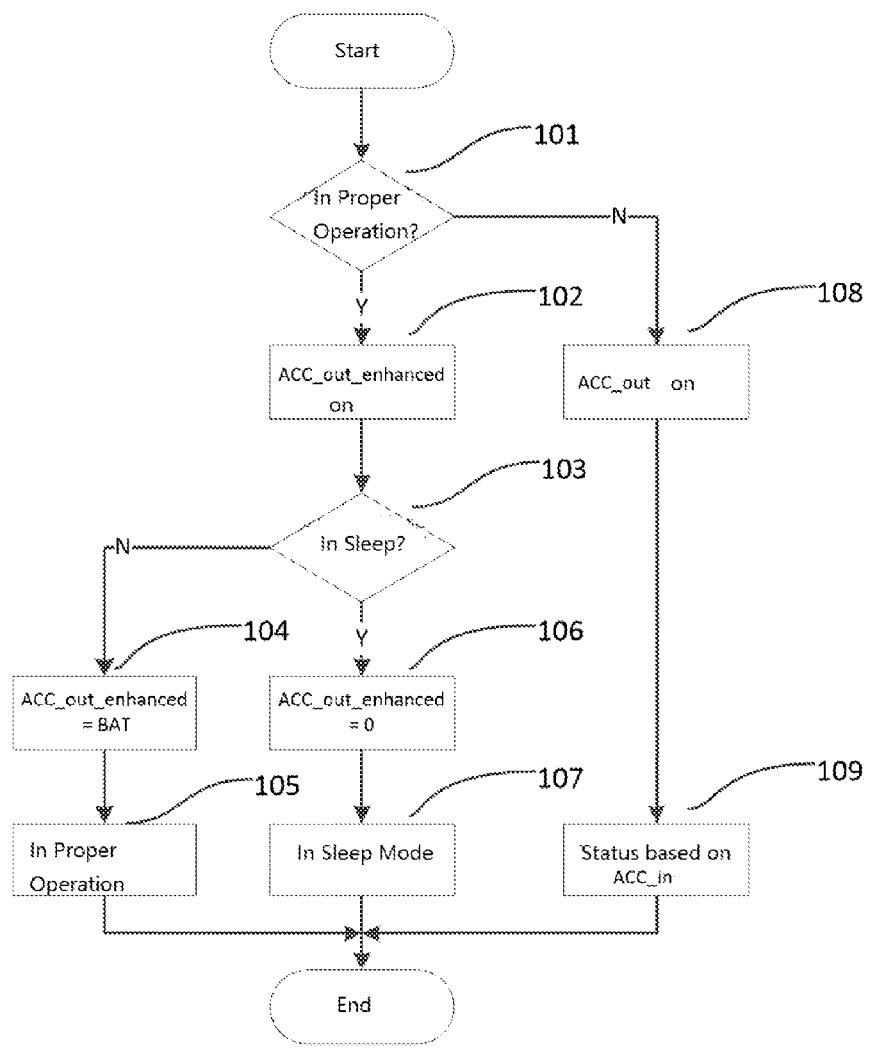
FIG. 3 shows a method of controlling the vehicle-mounted electronic component with the smart power supply interface according to one embodiment of the present invention.

FIG. 3 shows a method of controlling the vehicle-mounted electronic component with the smart power supply interface according to one embodiment of the present invention.

First, at step 101, it is determined whether the smart power supply interface module 1 is properly operating.

If the smart power supply interface module 1 is properly operating, at step 102, its ACC enhanced interface (ACC_out_enhanced line) is connected with the ACC interface (ACC line) of the component function module 2.

Next, at step 103, it is determined whether the smart power supply interface module 1 is in a sleep mode.

If the smart power supply interface module is not in the sleep mode, at step 104, the ACC enhanced output interface (ACC_out_enhanced line) is caused to transfer the electrical level of the BAT, thus causing the component function module 2 to operate properly at step 105. If the smart power supply interface module is in the sleep mode, at step 106, the level of the ACC enhanced output interface (ACC_out_enhanced line) is set to 0, thus causing the component function module 2 to be in the sleep mode at step 107. In some embodiments, the smart power supply interface module is in sleep mode when the smart power supply interface module determines that a battery level of the vehicle is less than a predetermined threshold; and the smart power supply interface modules is not in sleep mode when the smart power supply interface module determines that a battery level of the vehicle is greater than a predetermined threshold.

In another instance, for example, the smart power supply interface module 1 does not operate properly for some reason, then at step 108, its ACC output interface (ACC_out line) is caused to be connected with the ACC interface (ACC line) of the component function module, and then at step 109, the status of the component function module 2 is based on the status of the vehicle ACC input line (ACC_in line).

If the vehicle has not been running for an extended period of time, the component function module 2 may be started properly when the ACC input line voltage is normal, and if the vehicle has been running for an extended period of time such that there is a drop in voltage at the ACC input line (ACC_in), the component function module 2 cannot be started properly when the ACC input line (ACC_in) voltage is too low. Additionally, when the vehicle is halted (i.e., when the engine does not work) and there is no voltage on the ACC input line, the component function module 2 cannot be started.

In other embodiments of the present invention, the smart power supply interface module may also be encapsulated independently to make separate smart power supply interface devices (not shown), and connect them with the vehicle and third party aftermarket installed electronic component respectively.

At the vehicle-side, the smart power supply interface module 1 is connected with a vehicle fuse box through an ACC input line, a BAT line and a GND line, the smart power supply interface module 1 is also connected with a CAN bus (e.g., via CAN1, CAN2) of the vehicle. Additionally, the smart power supply interface module 1 is also connected with a vehicle transmission gear and a vehicle-mounted sensing module respectively through a transmission gear trigger signal line (Gear Trigger) and a sensing module signal line (Sensor), respectively.

At the component-side, the smart power supply interface module 1 is connected with the vehicle-mounted electronic component (or component function module 2) through a component-side BAT line, a GND line, a transmission gear trigger signal line (Gear Trigger), a sensing module signal line (Sensor) and a communication interface; additionally, the smart power supply interface module 1 has also an ACC output interface (ACC_out) and an ACC enhanced output interface (ACC_out_enhanced) for the gating connection of the ACC interface (ACC) of the vehicle-mounted electronic component.

It should be appreciated that the above description is intended to be illustrative, and not restrictive. For example, the above-described embodiments (and/or various aspects thereof) may be used in combination with each other. In addition, many modifications may be made to embodiments without departing from the of the scope invention in order to adapt a particular situation or material. While the specific components and processes described herein are intended to define the parameters of the various embodiments, they are by no means limiting and are exemplary embodiments. Many other embodiments will be apparent to those of skill in the art upon reviewing the above description. The scope of the invention should, therefore, be determined with reference to the claims, along with the full scope of equivalents to which such claims are entitled. In the claims, the terms "including" is used as the plain-English equivalents of the term "comprising." In addition, throughout the specification, numbers and sequence numbers are used merely as labels, and are not intended to impose numerical requirements on their objects. In addition, the above description may repeat reference numerals and/or letters in the various examples. This repetition is for the purpose of simplicity and clarity and does not in itself dictate a relationship between the various embodiments and/or configurations discussed.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

The invention claimed is:

1. A method of controlling
a vehicle-mounted electronic component with a smart power supply interface, including a smart power supply interface module and a component function module, wherein the smart power supply interface module has a vehicle-side interface configured to connect with one or more vehicle lines of a vehicle and a component-side interface configured to connect with the component function module; the component function module configured to implement a function of the vehicle-mounted electronic component at a vehicle-side, the smart power supply interface module being configured to connect with a vehicle fuse box through an ACC input line, a BAT line and a GND line, the smart power supply interface module being configured to connect with a CAN bus of the vehicle, the smart power supply interface module being configured to connect with a vehicle transmission gear and a vehicle-mounted sensing module respectively through a gear trigger signal line and a sensing module signal line, respectively; at a component-side, the smart power supply interface module being configured to connect with the component function module through a component-side BAT line, a GND line, a gear trigger signal line, a sensing module signal line and a communication interface; the smart power supply module being configured to connect with the component function module through an ACC output interface or an ACC enhanced output interface via a gating connection to an ACC interface of the component function module;
the method comprising:
determining whether the smart power supply interface module is properly operating;
if the smart power supply interface module is properly operating, connecting an ACC enhanced interface of the smart power supply interface module with an ACC interface of the component function module;
determining whether the smart power supply interface module is in a sleep mode;
if the smart power supply interface module is not in a sleep mode, using the ACC enhanced output interface of the smart power supply interface module to transfer an electrical level of a BAT to the component function module, thereby causing the component function module to operate properly; and if the smart power supply interface module is in a sleep mode, setting an electrical level of the ACC enhanced output to be zero (0), thereby causing the component function module to operate in a sleep mode.

2. The method according to claim 1, wherein in the step of determining whether the smart power supply interface module operates properly, if the smart power supply interface module does not operate properly, connecting an ACC output interface of the smart power supply interface module with the ACC interface of the component function module, and a status of the component function module is determined by a status of a vehicle ACC input line.

3. The method according to claim 1, wherein the vehicle has only one CAN bus, and the smart power supply interface module is connected with the only one CAN bus of the vehicle.

4. The method according to claim 1, wherein the vehicle has two CAN buses, and the smart power supply interface module is connected with both of the two CAN buses of the vehicle.

5. The method according to claim 1, wherein the vehicle has only one CAN bus, and the smart power supply interface module is connected with the only one CAN bus of the vehicle.

6. The method according to claim 1, wherein the vehicle has two CAN buses, and the smart power supply interface module is connected with both of the two CAN buses of the vehicle.

7. The method according to claim 1, wherein the component function module includes a navigating module, a rearview module or a driving recording module.

8. The method according to claim 1, wherein the component function module is a rearview module, the vehicle transmission gear is a reverse gear, and the vehicle-mounted sensing module is a vehicle rearview camera.

9. The method according to claim 1, wherein the component function module is a driving recording module, the vehicle transmission gear is a driving gear or reverse gear, and the vehicle-mounted sensing module is a driving recording camera.

10. The method according to claim 1, wherein the vehicle-mounted sensing module is a G-sensor.

* * * * *